Aug. 2, 1932.    G. JOHNSON    1,870,051
SNAP FASTENER MEMBER AND METHOD OF MAKING THE SAME
Filed May 8, 1930    2 Sheets-Sheet 1
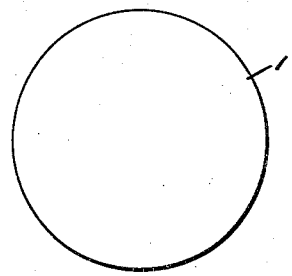
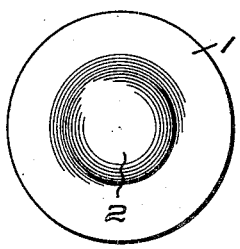
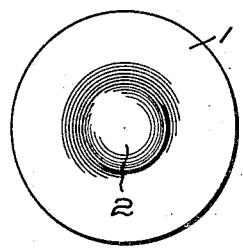
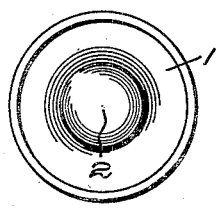
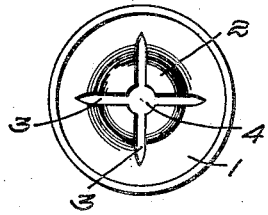
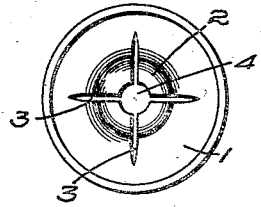
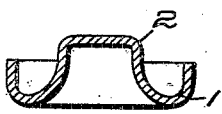
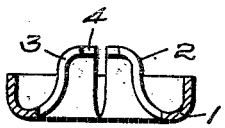
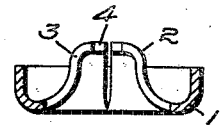
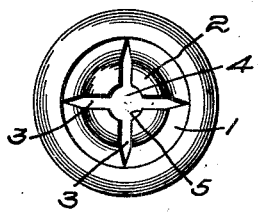
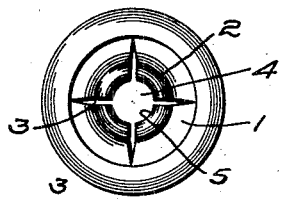
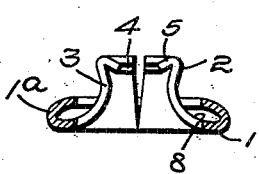
Inventor:
Gustav Johnson Aug. 2, 1932.   G. JOHNSON   1,870,051
SNAP FASTENER MEMBER AND METHOD OF MAKING THE SAME
Filed May 8, 1930   2 Sheets-Sheet 2
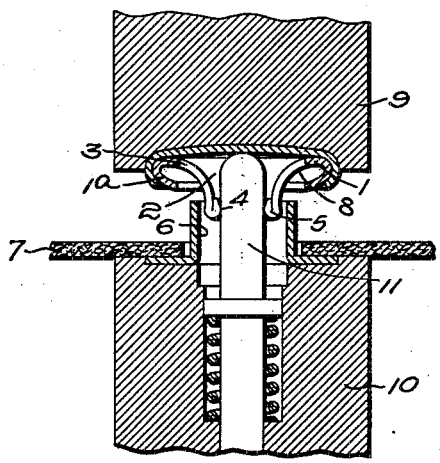
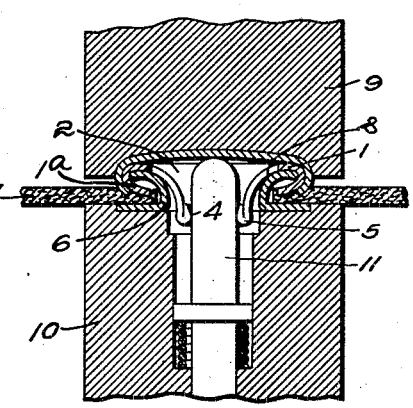
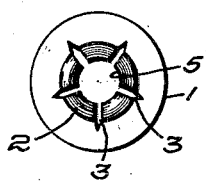
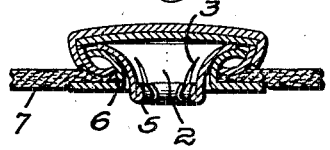

Patented Aug. 2, 1932

1,870,051

UNITED STATES PATENT OFFICE

GUSTAV JOHNSON, OF WEST ROXBURY, MASSACHUSETTS, ASSIGNOR TO UNITED-CARR FASTENER CORPORATION, OF CAMBRIDGE, MASSACHUSETTS, A CORPORATION OF MASSACHUSETTS

SNAP FASTENER MEMBER AND METHOD OF MAKING THE SAME

Application filed May 8, 1930. Serial No. 450,734.

My invention aims to provide improvements in snap fastener members and the method of forming the same.

Reference is hereby made to my divisional application Serial No. 494,030, filed November 7, 1930.

In the drawings which illustrate a preferred embodiment of my invention:—

Figures 1 through 4 show the steps of forming a boss in a flat plate to provide a stud-engaging portion for a socket, each figure including a plan and a section showing a particular step in the formation;

Fig. 5 includes a plan and a cross-section of the part shown in Fig. 4 after the slots have been made in the boss portion;

Fig. 6 includes a plan and a cross-section of the part shown in Fig. 5 after the boss has been compressed to reduce the width of the slots;

Fig. 7 includes a plan and a cross-section of the socket piece showing a step in the forming of the ends of the yieldable fingers of the boss and the forming of the attaching means;

Fig. 8 shows, in plan and in section, the completed socket part after the boss has been successively laterally compressed to reduce the width of the slots;

Figs. 9 and 10 show the method and means of attachment of the socket to a structure;

Figs. 11 and 12 show respectively a plan and a section of a socket part similar to that shown in Fig. 10 but without the integral attaching means; and Fig. 13 shows a socket installation including the part shown in Figs. 11 and 12.

Referring to the drawings, and particularly to the stud-engaging part of the socket installation shown in Fig. 10, I have shown a snap fastener stud-engaging part having a base 1 from which is pressed a central boss 2, divided by slots 3 and having a stud-receiving aperture 4. The stud-receiving aperture 4 is surrounded by jaw portions 5. The peripheral portion of the base 1 is rolled over to provide a substantially U-shaped portion 1ª into which the rivet 6 or other attaching means is forced when the socket is attached to a supporting structure 7 (Fig. 10) in the usual manner. The central boss 2 is preferably curved adjacent to the base 1 to provide an anvil portion 8 against which the end of the rivet 6 is forced to be turned into the U-shaped portion 1ª.

Heretofore, sockets of the same general construction, as illustrated in the drawings, have been manufactured, but so far as I am aware such sockets were provided with stud-engaging parts having slots which were of such width in the anvil portion that they interfered with the proper turning of the rivets or prongs of the parts used to attach the sockets to their supports, or the slots were not carried into the anvil portion. I have found that if the slots in the anvil portion are of the usual width the end of a rivet many times becomes deformed improperly because material thereof catches in the slots thereby making an imperfect attachment of the socket installation. If the slots are not carried into the anvil part the yieldable fingers of the boss are too short and become "set" thereby rendering the fastener of little or no value.

My invention overcomes the difficulties specified above by utilizing a different and additional method of manufacture and at the same time producing a fastener part which in appearance is the same as those having the slots of usual width extending into the anvil portion. In my device the slots are substantially closed in the anvil portion so that the anvil presents a substantially continuous surface against which the rivet or attaching prongs may be upset without interference from the slots.

The method of making the stud-engaging part shown in the drawings is the same as has been practiced heretofore with the exception of the method of making the slots 3 in the boss 2. Therefore, I shall describe only that part of the method which I consider as necessary to understand my invention.

The boss 2 is formed from a blank (Fig. 1) in the usual manner by successive "drawing" operations, as shown in Figs. 2, 3 and 4. Then the part is presented to suitable stamping means which cuts out the boss 2 to provide the slots 3 and the aperture 4, as shown in Fig. 5. The slots 3 extend throughout the length of the boss 2 and taper so that they are somewhat more narrow at their ends adjacent to the base 1 than at the outer end of the boss. The lots as shown in Fig. 5 are about as narrow as can be made by any practical method known by me prior to my new method and indicate quite clearly that they are wide enough in the anvil portion 8 (Fig. 5) to interfere with the proper setting of a rivet or prongs by admitting portions thereof.

I have found that the boss 2, as shown in Fig. 5, may be compressed to reduce the diameter thereof by squeezing it between suitable dies (not shown) thereby reducing the width of each slot 3, as shown in Figs. 6, 7 and 8. Thus that portion of each slot which is located in the anvil portion 8 is substantially closed (see the section Fig. 8) and therefore a substantially continuous surface is presented against which the rivet 6 is pressed when attaching the socket to its support 7. The remaining operation of forming the jaws 5 at the stud-receiving aperture 4 and the U-shaped clenching portion 1ª is substantially the same as heretofore practiced and as shown in Figs. 7 and 8.

While the boss 2 might be compressed by a single operation to secure the desired results of closing the slots in the anvil portion 8, I prefer to do it in successive operations and while the other elements are being formed as illustrated in Figs. 6, 7 and 8.

By closing the slots 3 in the manner above described, I do not in any way interfere with the action of the fastener part because when a stud head is pressed through the stud-receiving aperture 4 the fingers of the boss 2 expand thereby tending to enlarge the slots rather than to make them smaller. Furthermore it should be noted that the rivet (Fig. 10) "curls" in such a manner that it is spaced slightly from the anvil portion 8 after it has been completely set. Therefore even though the end of the rivet engages the yieldable anvil portion 8 during the first part of the setting operation the "curling" action spaces the intermediate portion of the rivet from the anvil portion sufficient distance to permit expansion thereof during engagement and disengagement of the socket with a stud.

Figs. 9 and 10 have been shown to illustrate the assembly of the parts with which my stud-engaging part is usually used. In Fig. 9 an idea of the point where the rivet will engage the anvil portion 8 (when the slots 3 are substantially closed) is given and the setting members 9 and 10 are shown, together with the spring-pressed plunger 11 carried by the setting member 10 to show how the parts are pressed together. The plunger 11 enters the stud-receiving aperture and engages the jaws 5 so that the fingers of the boss 2 cannot be "set" to reduce the size of the stud-receiving aperture 4 during the assembly operation.

In Figs. 11, 12 and 13 I have shown a stud-engaging part similar to the one shown in Figs. 8, 9 and 10 except that the U-shaped portion is not provided as a part of the stud part. The assembly shown in Fig. 13 is well known and is illustrated to show that my invention is not limited to any particular structure or type of snap fastener member.

While I have shown and described illustrative embodiments and a method of forming my invention, I do not wish to be limited thereto because the scope of my invention is best defined in the following claims.

Claims:

1. The method of forming a hollow sheet metal resilient snap fastener member having means for upsetting an attaching element which comprises providing a piece of sheet metal with a boss for snap fastening engagement with a cooperating snap fastener member, said boss being joined at its base with the upsetting means, dividing the boss into a number of yieldable portions by cutting slots in the boss and thereafter compressing the boss to reduce the width of each slot especially at its inner end, thereby to provide a substantially continuous surface adjacent to the upsetting means to prevent interference with the attaching element when pressed against said upsetting means.

2. The method of forming a hollow sheet metal resilient snap fastener member having means for upsetting an attaching element which comprises providing a piece of sheet metal with a boss for snap fastening engagement with a cooperating snap fastener member, said boss being joined at its base with the upsetting means, dividing the boss into a number of yieldable portions by cutting slots in the boss and thereafter compressing the boss to reduce the width of each slot especially at its inner end, thereby to provide a substantially continuous yieldable surface adjacent to the upsetting means to prevent interference with the attaching element when pressed against said upsetting means while being yieldable relative to the upsetting means as illustrated and described.

In testimony whereof I have signed my name to this specification.

GUSTAV JOHNSON.